United States Patent [19]

Hinckley

[11] Patent Number: 4,791,545
[45] Date of Patent: Dec. 13, 1988

[54] ZERO-CROSSOVER SCR POWER SUPPLY REGULATOR

[75] Inventor: Paul Hinckley, Hicksville, N.Y.

[73] Assignee: Unisys Corporation, Blue Bell, Pa.

[21] Appl. No.: 40,020

[22] Filed: Apr. 20, 1987

[51] Int. Cl.$^4$ .................................... H02M 7/162
[52] U.S. Cl. .................................. 363/81; 323/235; 323/246; 363/87; 363/129
[58] Field of Search .................. 323/235, 246; 363/81, 363/85, 87, 128, 129g

[56] References Cited

U.S. PATENT DOCUMENTS

| | | | |
|---|---|---|---|
| 3,825,812 | 7/1974 | De Buhr | 363/87 |
| 4,053,945 | 10/1977 | Dumas | 363/129 |
| 4,329,595 | 5/1982 | Watson | 363/87 |
| 4,455,598 | 6/1984 | Andre | 363/129 |
| 4,490,780 | 12/1984 | Nondahl | 363/87 |
| 4,523,267 | 6/1985 | Mehl | 363/87 |

Primary Examiner—Patrick R. Salce
Assistant Examiner—Jeffrey Sterrett
Attorney, Agent, or Firm—Albert B. Copper; Arnold L. Albin

[57] ABSTRACT

A circuit for regulating the output of a DC power supply that substantially eliminates turn-on transients induced by the switching of a silicon-controlled rectifier (SCR). A zero-crossover detector senses the AC voltage waveform of an applied power source and provides a trigger signal at the zero-crossing point. The trigger signal is applied to cause induction of the SCR's and raise the output voltage when the power supply output drops below a regulated value, and is interrupted so as to inhibit conduction of the SCR's and decrease the output voltage when the power supply output exceeds the regulated value.

11 Claims, 4 Drawing Sheets

(a) AC INPUT WAVEFORM (b) PHASE-CONTROLLED SCR REGULATOR (c) ZERO-CROSSOVER REGULATOR

ZERO-CROSSOVER SCR POWER SUPPLY REGULATOR

The United States Government has rights in this invention under Contract N00024-78-C-4008.

BACKGROUND OF THE INVENTION

1. Field of the Invention

The invention relates generally to the field of power supply circuits, and more particularly to a zero-crossover circuit for regulating the output of DC power supply to eliminate turn-on transients of silicon-controlled rectifiers.

2. Description of the Prior Art

It is known in the prior art that regulation of a DC power supply may be obtained by phase control switching of the AC supply. This permits controlling the average power to the lead by changing the on-off duty cycle. Control is accomplished by governing the phase angle of the AC wave at which a silicon-controlled rectifier (SCR) is triggered. SCR regulated DC power supplies are highly efficient and can operate directly from the AC power lines, thus alleviating the need for a power transformer. In addition, these supplies are readily adapted to a "soft-start" capability to limit turn-on surges of current. In phase-controlled SCR regulators, an SCR is triggered when the SCR is forward biased at a point on the input waveform that is dependent on the developed DC voltage. Thus, when more current is drawn from the DC output of the power supply, the output voltage drops, requiring that the control circuit trigger the SCR at an earlier point in the input waveform. This provides more current to raise the output DC voltage. When less current is required from the power supply output, the output voltage increases. The control circuit then triggers the SCR's at a later point on the input waveform, to supply reduced current which lowers the output voltage. Thus, by varying the trigger point at which the SCR devices are switched, it is possible to regulate the DC power supply output voltage.

Referring now to FIG. 1, the operation of a single-phase silicon-controlled regulator is illustrated. Fundamentally, the principle of operation with three or more phases is the same but the more complex waveshapes render it not as useful as an example. FIG. 1(a) shows an AC sine wave as would be applied to the input of the regulated power supply. In the prior art phase-controlled SCR regulator, each SCR is forward biased. Once turned on, the SCR will continue to conduct until the forward voltage again goes to zero. For example, during the positive one-half cycle of the AC sine wave voltage, SCR Q1 is biased to be triggered on at the peak of the sine wave as shown by the solid vertical line 130 of FIG. 1(b). When the AC waveform returns to the zero level, as at point 132, the SCR stops conduction. When the AC sine wave reaches the peak of the negative half of the sine wave, then SCR Q2 is triggered on as shown at line 134. When more current is demanded from the DC output of the power supply, the output voltage across C1 will drop. This causes the prior art SCR regulator circuit to trigger Q1 and Q2 earlier, as indicated by lines 136 and 138, and results in providing more current to raise the output voltage to the desired regulated value. If the load demands less current from this DC output, the output voltage will rise. The control circuit thereupon triggers the silicon control rectifiers Q1 and Q2 at a later point on the waveform as indicated by lines 140 and 142. This results in less average current being provided to the load and a lower output voltage results. Thus, by varying the trigger point at which the silicon-controlled rectifiers all switched therefor, it is possible to regulate the DC output voltage.

It has been found that an SCR when triggered will change state from turn-off to turn-on within one microsecond or less. This substantially instantaneous switching at high voltage and high current may generate high intensity electromagnetic transient voltages. These voltages may be coupled inductively or conductively to cause severe electromagnetic interference to other equipment connected to the common AC power lines located in proximity to the phase-control SCR regulator circuit.

It is desired therefore to provide a regulator circuit which maintains the high efficiency of the phase-controlled SCR regulated DC power supply while minimizing the generation of electromagnetic interference transients. The present invention eliminates these transients by triggering the silicon-controlled rectifiers only when the AC sine wave is crossing through the zero point.

SUMMARY OF THE INVENTION

The present invention controls the point at which a silicon controlled regulator is switched so that it switches at virtually zero voltage, thereby minimizing the generation of electromagnetic interference transients. This is accomplished by the use of a zero-crossover control circuit wherein regulation is accomplished by switching the SCR's on or off at the zero-crossover point of the input AC voltage waveform.

The regulator comprises a zero-crossover circuit which senses the AC voltage waveform and provides a trigger signal at the zero-crossing point of an applied AC voltage source. When the zero-crossing trigger signal is received, conduction of the SCR will be initiated substantially coincident with the zero-crossing of the applied AC voltage source.

As with the phase-controlled SCR regulators, several SCR's and rectifier diodes are connected to form a diode bridge that produces a DC voltage output from the AC input power.

The DC output voltage is detected by a logic circuit. If the DC output voltage is too high, the logic circuit inhibits the trigger signals to the SCR's to lower the output voltage. If the DC output voltage is too low, the logic circuit applies the trigger signals to the SCR's to raise the output voltage.

Figure 2:
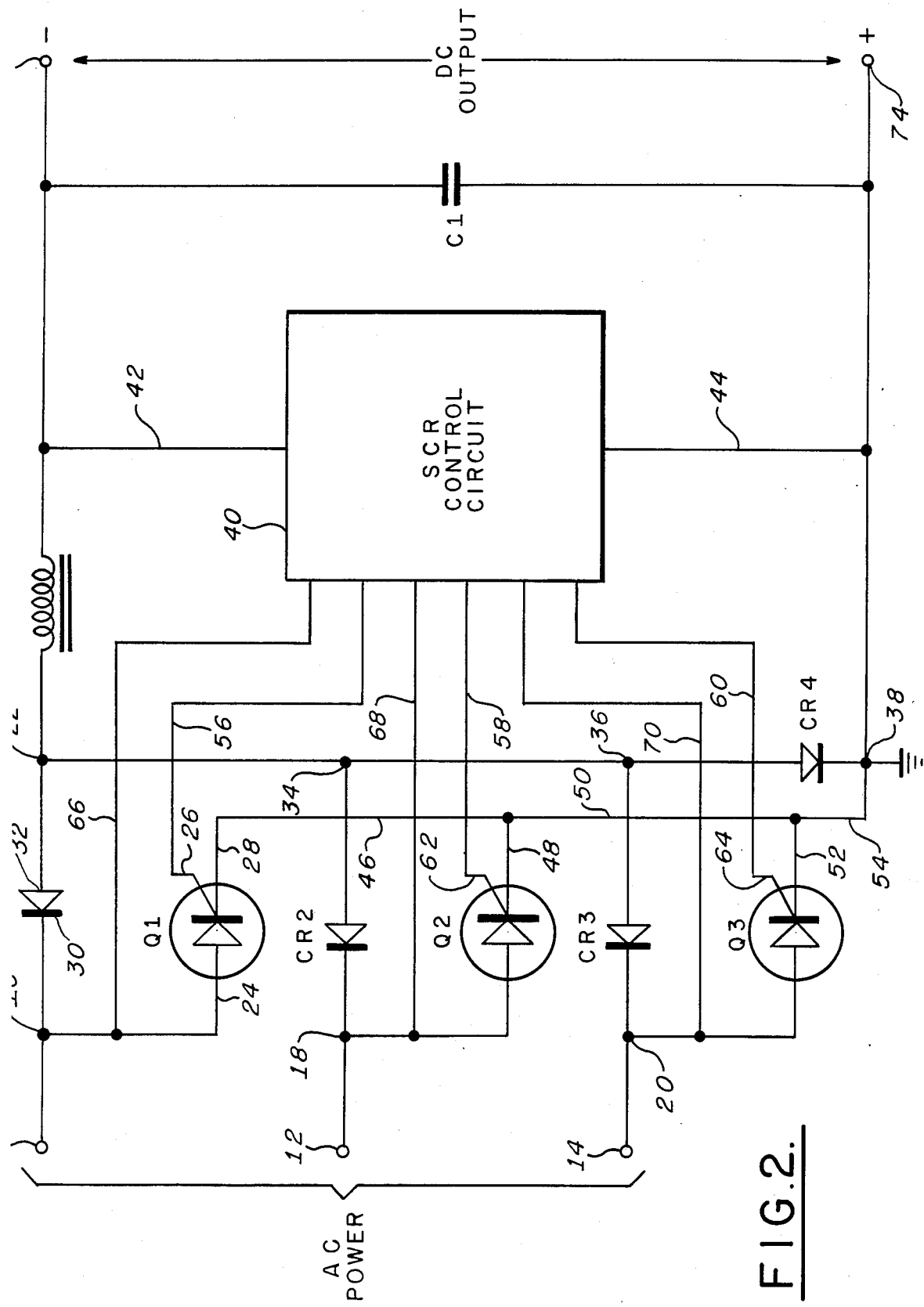
FIG. 2 is a schematic diagram of a power supply circuit which may be used with a zero-crossing SCR control circuit.
Figure 3:
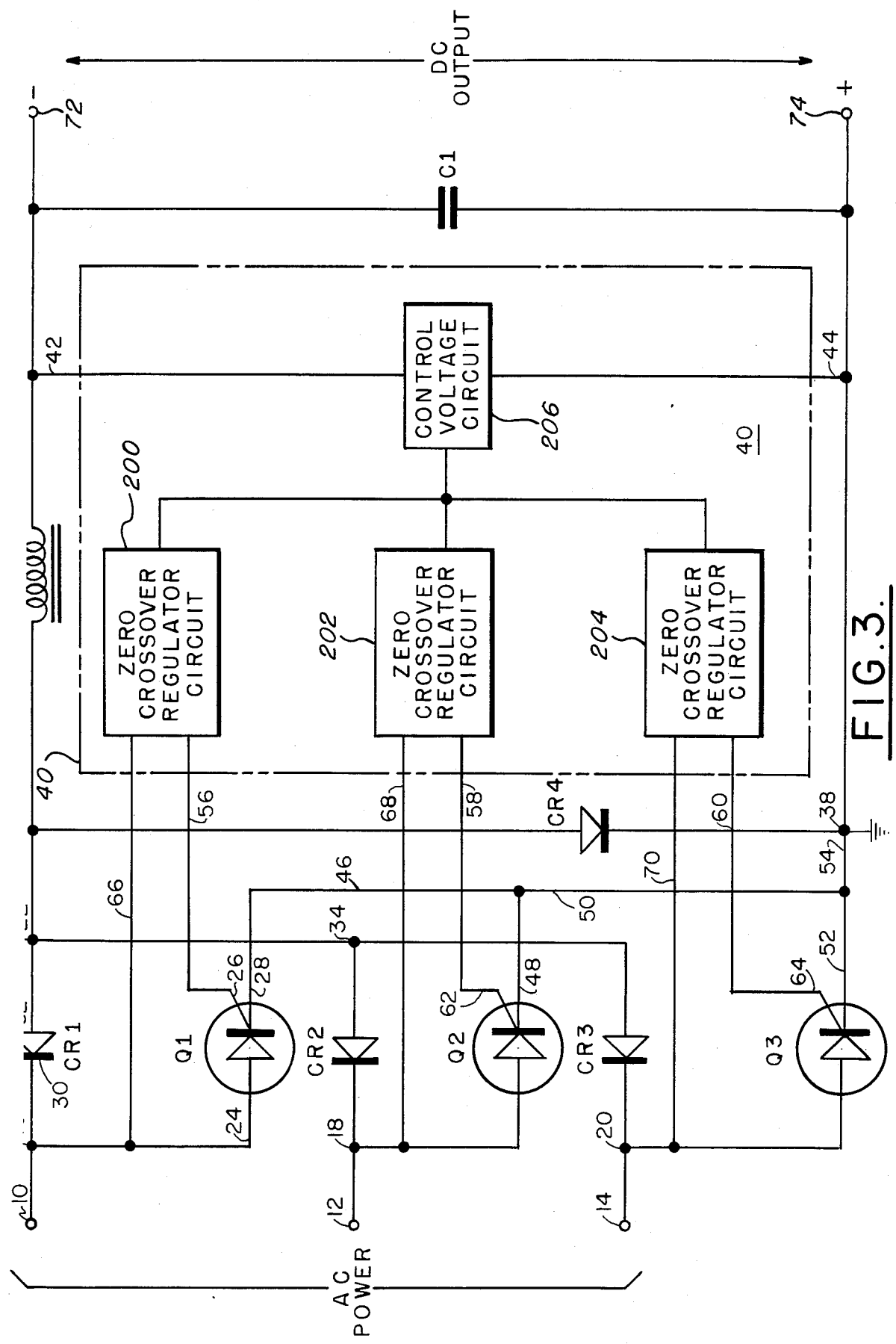
FIG. 3 is a schematic diagram showing features of the present invention as applied to a three-phase power supply.
Figure 4:
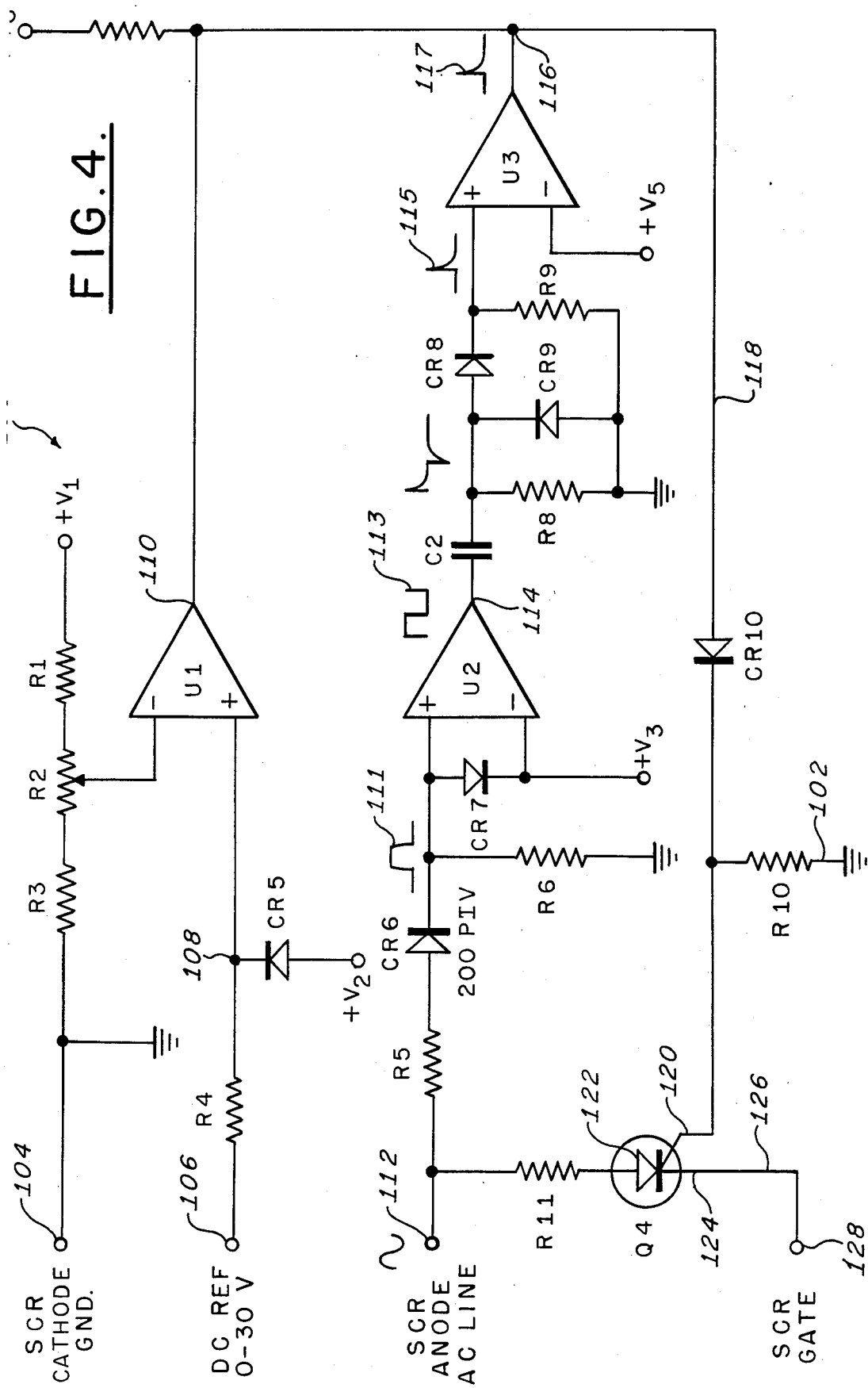
FIG. 4 is a schematic diagram of the zero-crossing circuit of the present invention.

Table 1 shows typical circuit parameters for the component elements of FIGS. 2, 3 and 4.

DESCRIPTION OF THE PREFERRED EMBODIMENT

FIG. 2 is a block diagram of a system incorporating a plurality of silicon controlled rectifiers (SCR's) and unidirectional conducting elements, which may be comprised of diodes having a suitable peak inverse voltage rating, coupled for developing a DC voltage from an applied three-phase AC power source. Diodes CR1, CR2, and CR3 form the negative-input half of a conventional bridge rectifier. The positive-input diodes of the bridge have here been replaced by silicon controlled rectifiers labelled Q1, Q2, and Q3. The SCR control circuit 40 regulates the output of the power supply by switching the silicon-controlled rectifiers located in the positive side of the polyphase diode bridge. Regulation is accomplished by either switching the SCR's on or by not switching them on, precisely of the zero-crossover at the input AC voltage waveform. Since the zero-crossover control circuit switches at virtually zero voltage, the result is essentially no EMI transients.

If the silicon control rectifiers are continuously triggered by the control circuit 14, diodes CR1, CR2, CR3 and silicon control rectifiers Q1, Q2, and Q3 will act as a conventional full-wave bridge rectifier. Inductor L1 and capacitor C1 act as a filter to reduce the AC ripple, thereby providing a relatively ripple-free DC output voltage at terminals 72 and 74. While a three-phase circuit is shown in FIG. 2 for exemplary purposes, it is known to one skilled in the art that a single-phase circuit would require only two rectifier diodes and two silicon control rectifiers and that additional phases would each require a rectifier diode and silicon-controlled rectifier.

Each SCR, Q1, Q2, and Q3, has an anode 24, a cathode 28, and a gate 26. Each SCR is preferably identical with all the other SCR's. SCR Q1 has its anode coupled to the cathode 30 of diode CR1 at junction 16. Similarly, SCR Q2 is coupled to diode CR2 at junction 18 and SCR Q3 is coupled to diode CR3 at junction 20. The input from the AC power source is applied to terminals 10, 12, and 14, respectively coupled to junctions 16, 18, and 20. Each diode CR1, CR2, and CR3 rectifies one half of the applied AC input waveform to provide a DC voltage which is coupled at nodes 22, 34, and 35 in common to an inductive element L1. L1 is a choke connected in series with the load to shunt capacitor C1 and to provide a filtered DC output to the load and to SCR control circuits 40 via lead 42 and return 44. A commutating diode CR4 is coupled between node 36 and ground 38. The rectified DC voltage from SCR elements Q1, Q2, and Q3 is coupled via leads 46, 48, 50, 52, and 54 to DC ground 38 The polarities of the SCR and diode elements are so arranged as to provide a full-wave bridge rectified output with the ground return at a positive potential.

SCR control circuit 40 comprises a plurality of zero-crossover sensing circuits coupled on lines 56, 58, and 60 to gate electrodes 26, 62, and 64 of SCR elements Q1, Q2, and Q3, respectively. Each of the SCR control circuits includes circuitry for sensing the zero-crossover point of the input voltage waveform and is coupled to the respective anode of the associated SCR. Lead 66 is coupled to the anode 24 of SCR Q1 while leads 68 and 70 are coupled to the anodes of SCR elements Q2 and Q3, respectively. Each SCR when gated by control circuit 40 provides a rectified DC current. The common coupling of diodes CR1, CR2, and CR3 and of SCR elements Q1, Q2, and Q3 provide an average voltage derived from the average current in each rectifier element with the active portion of the waveform applied to the SCR elements controlled by control circuit 40. As will be described in more detail below, it is the function of the SCR control circuit 40 to turn off the SCR's when it is sensed that the load applied to the DC output has permitted the output voltage to rise beyond a predetermined potential, and to turn on the SCR's when it is determined that the sensed output voltage of the supply is below the predetermined potential. The DC output is applied at terminals 72 and 74 to a load, not shown.

The SCR control circuit is further illustrated in FIG. 3. Each SCR Q1, Q2, Q3 is controlled by a zero-crossover regulator circuit 200, 202, 204, respectively, that generates a trigger signal for the SCR. A control voltage circuit 206 produces a control voltage that is inversely proportional to the DC output voltage across terminals 72–74. Each crossover regulator circuit compares the control voltage to a reference voltage (not shown) to determine whether or not to turn on the SCR.

FIG. 4 is a schematic circuit diagram of a zero-crossover regulator circuit for providing a trigger signal at the zero-crossing of one phase of the applied AC voltage source. Since each SCR Q1, Q2, Q3 of FIGS. 2 and 3 is the same as all other SCR's, and each regulator circuit 200, 202, 204 of FIG. 3 within SCR control circuit block 40 is the same as all other control circuits, only one such circuit will be described in detail. Terminal 104 in FIG. 4, the SCR cathode ground, is connected to the positive (+) DC output bus 74 of FIG. 3 via interconnecting wiring, not shown. A DC reference voltage which is a function of the developed DC voltage at terminals 72 and 74 is applied to terminal 106. This voltage is arranged to vary inversely as the magnitude of the DC output voltage of the power supply. A clamp voltage, which may be +1.4 v, is applied at terminal V2 to a diode CR5. The DC reference voltage at terminal 106 is applied through resistor R4 to the positive terminal of a control logic element U1, which may be an integrated circuit comparator. A reference bias signal is derived from voltage divider R1, R2, R3 and applied to the negative terminal of U1. A supply voltage +V1 is applied through resistor R1 to provide an adjustable bias via resistor R2.

The output of logic element U1 is either a logic high or logic low on line 110 and is a function of the difference of the biases applied to the input terminals. Hence resistor R2 may be adjusted to vary the regulated DC voltage.

The control circuitry 100 further includes an input terminal 112 connected to one line of the AC power source, which also connects to the SCR anode. The applied voltage, which may be the line voltage for a single phase supply, or the phase voltage for a polyphase power source, is applied to resistors R11 and R5. Resistor R5 is coupled to a diode CR6 and load resistor R6, which is terminated to the ground bus. The output of diode CR6 is a rectified half wave and is applied to the positive input of logic element U2, which may be a comparator. The negative side of logic element U2 is connected to a power source +V3, which may be typically a 1.4 v supply. A diode CR7 is coupled with its anode connected to the positive terminal and the cathode to the negative terminal of logic element U2. Diode CR7 clips the rectified sine wave from CR6 to provide waveform 111. Logic element U2 is a high gain integrated circuit, so that the output 114 is a square wave synchronized with the AC line input. The signal on line 114 is applied to series capacitor C2, shunt resistor R8, shunt diode CR9, and series diode CR8. Capacitor C2 and resistor R8 act as a differentiating network while diode CR9 clips the negative-going portion of the waveform. The result is a positive-going spike applied to the anode of diode CR8. The cathode of diode CR8 is coupled to one end of shunt resistor R9. The signal at the junction of resistor R9 and the cathode of diode CR8 is applied to the positive terminal of a third logic element U3, which may also be an integrated circuit comparator. A further bias +V5, of the order of +1.4 v, is applied to the negative input of logic element U3. It will be understood by one skilled in the art that additional power supply and return voltages, which are not shown here for purposes of clarity, will also be required to be applied to logic elements U1, U2, and U3. The output of logic element U3 at node 116 is combined with the signal from logic element U1 on line 110 and coupled on line 118 to the anode of diode CR10. The signal on the cathode of diode CR10 is applied to shunt resistor R10 and to the gate 120 of an SCR Q4. The cathode 124 of SCR Q4 is coupled via line 126 to terminal 128 which in turn feeds the SCR gate of Q1, Q2, or Q3. Resistor R11, connected to the AC line 112, serves to limit the current through SCR Q4 and is coupled to anode 122.

Referring again to FIG. 2, it is desirable that the resonant frequency of LC ripple filter L1, C1, must be well below the power-line frequency. Further, the choke L1 should have a high inductance at the power line frequency to limit the inrush current surge during a single half-cycle. Because of the required high inductance of the choke L1, a commutating diode, CR4, is provided so that the choke may continue drawing current after the silicon controlled rectifiers cease conduction. In the absence of the commutating diode, the stored current in the inductive filter would result in maintaining current flow through the SCR and the bridge rectifier during the time the line voltage goes through zero, preventing turn-off of the SCR. The diode CR4 provides a return path for the stored energy in inductor L1 and permits normal commutation of the bridge rectifier.

Referring now to FIG. 2, the operation of the zero-crossover regulator circuit will be described. It will be understood that while a single-phase circuit is shown, an essentially identical circuit is required for each phase shown in FIG. 3. Referring now to FIG. 4, the anode of an SCR is connected to terminal 112 which applies AC line voltage. When the anode voltage of the SCR goes positive at zero-crossover, current flows through resistor R5 in series with rectifier diode CR6 and through clipping diode CR7 to the +V3 supply. Diode CR7 clips the sine wave at the forward conduction voltage (about 0.7 volt) of the diode. Waveform 111 shows the clipped half-wave rectified voltage at the output of diode CR6. When the AC line voltage applied to terminal 112 goes negative, any current flow is blocked by the reverse bias across diode CR6 and therefore the plus input of logic element U2, which is returned to signal ground through resistor R6, goes to a logic low condition with respect to the minus input which is biased at approximately +1.4 volts, therefore causing the output 114 to go to a logic low. In consequence the output obtained at 114 is a square wave 113 synchronized with the AC line voltage.

Capacitor C2 and resistor R8 is arranged in a conventional differentiating network. Thus the square wave signal applied from line 114 produces a positive spike at the positive-going zero-crossover of the AC waveform and a negative spike at the negative-going zero-crossover of the AC waveform. Diode CR9 shunts the negative portion of the spike waveform to ground while the positive spike is applied through diode CR8 to the positive terminal of logic element U3. Waveform 115 shows the resultant positive spike. A reference bias supply +V5 is applied to the negative terminal of logic element U3. When the positive input of U3 goes high relative to the negative input, the logic element also produces a logic high. Resistor R12 is a pull-up resistor for the output of U3. The result is a positive spike 117 that is applied through junction 116 and lead 118 to diode CR10 and resistor R10. The positive spike is turn is applied to the gate 120 of electronic switch Q4 to trigger conduction of switch Q4. This trigger signal in turn is applied through lead 126 to terminal 128 and the gate of the associated SCR. Resistor R11 limits the trigger current through SCR Q4. Since the positive spike at the output of logic element U3 is synchronized with the positive-going zero-crossover voltage across SCR Q4, the SCR is triggered only at zero-crossover.

A 0–30 VDC reference signal at terminal 106 is developed from the DC output voltage of the power supply. The developed voltage is arranged to increase with a decrease in the DC output voltage of the power supply, and to decrease with an increase in the DC output voltage of the power supply. The DC reference voltage is applied to the positive input of logic element U1. A further reference voltage is derived from the network R1, R2, and R3, energized by the +V1 supply. This bias voltage is applied to the minus terminal of logic element U1 and compared with the DC reference potential developed from the 0–30 V power supply voltage. If the power supply voltage exceeds a predetermined potential, the DC reference voltage will decrease below the voltage applied to the minus terminal of logic element U1 and the output 110 of U1 will go to a logic low. A logic low at output 110 will pull down the logic state at node 116 to a logic zero, regardless of the state of the incoming pulse 15. This inhibits the positive pulses applied at terminal 112. In consequence, SCR Q4 is not triggered for at least a portion of the AC sine wave, and the power supply output voltage decreases from the predetermined value, the 30 VDC reference bias, which varies inversely as the DC supply voltage, will increase to a value above the bias voltage applied to the minus terminal of logic element U1. The output 110 of U1 will go to a logic high condition, thus permitting the pulse train from logic element U3 to trigger SCR Q4 and the associated SCR bridge rectifiers. This will cause the power supply voltage to increase. Thus, the zero-crossover regulator circuit controls the power supply DC output by triggering the SCR rectifiers at zero-crossover when the output voltage is low, and by not triggering the SCR's when the output voltage is high.

Figure 1:
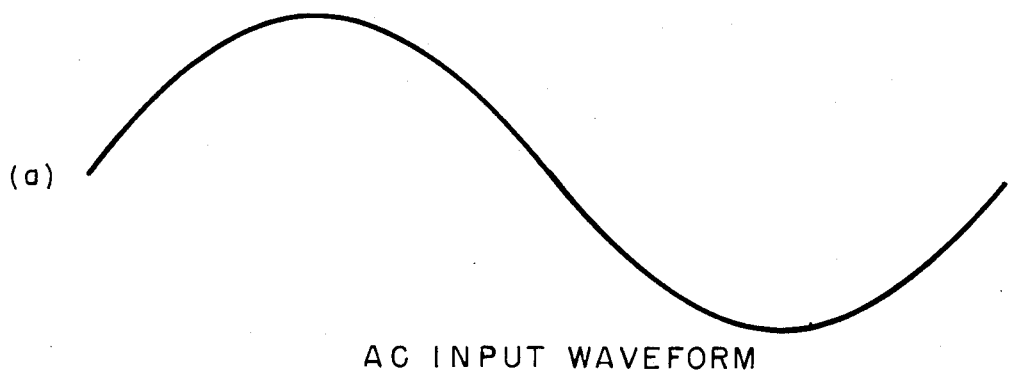
FIG. 1 is a waveform diagram showing the operation of phase-controlled and zero crossover SCR regulators.
Figure 1:
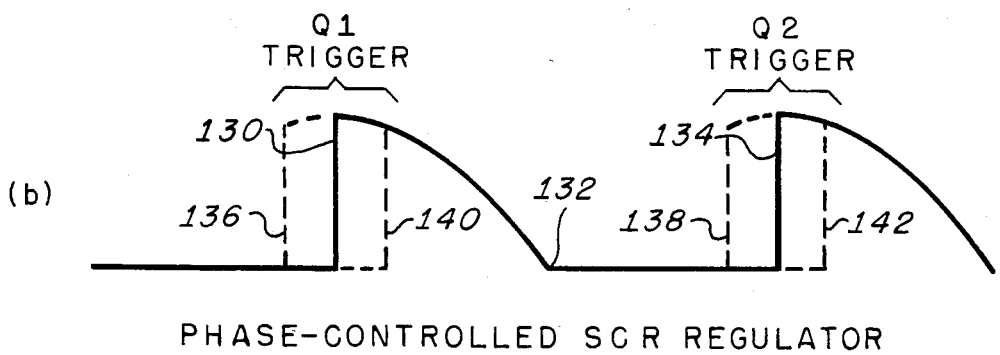
Figure 1:
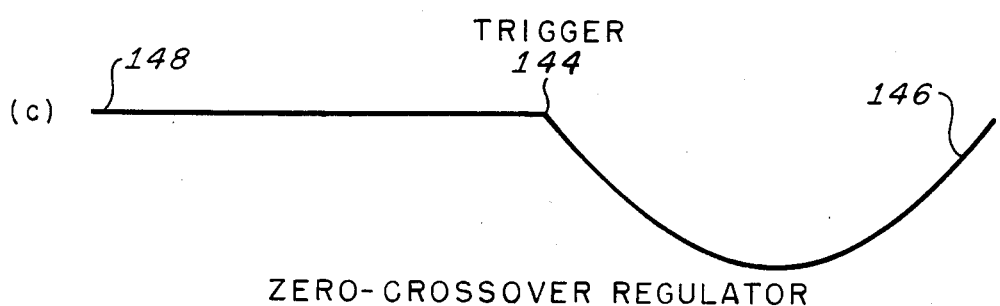

Referring now to FIG. 1(c), SCR Q2 is triggered at point 144 and continues in conduction to point 146. Note that both at the point where the SCR is turned on and turned off that there is a zero-voltage line condition. Since the DC output voltage is a function of the average current supplied by the rectifiers, regulation of the DC output voltage may be effected by either triggering or failing to trigger the silicon control rectifiers at the zero-crossover point. For example, if the DC output voltage has dropped, then SCR Q1 would be triggered at point 148. However, should the DC output voltage be excessive, then SCR Q1, Q2, or both would not be triggered at the start of the next half cycle of the AC sine wave.

Although the invention has been described as a polyphase regulator circuit, as will be noted by those skilled in the art it may readily be applied to a single phase circuit by providing a zero-crossover regulator in each side of the AC line.

While the invention has been described in its preferred embodiment, it is to be understood that the words which have been used are words of description rather than limitation and that changes may be made within the purview of the appended claims without departing from the true scope and spirit of the invention in its broader aspects.

TABLE 1

| | |
|---|---|
| $U_1$-$U_3$ | LM 339 |
| $Q_1$-$Q_3$ | 2N4216-N |
| $Q_4$ | 2N4216 |
| $CR_1$ | 1N1163 |
| $CR_2$-$CR_4$ | 1N1163 |
| $CR_5$ | IN914 |
| $CR_6$ | IN4003 |
| $CR_7$ | IN914 |
| $CR_8$ | IN914 |
| $CR_9$ | IN914 |
| $CR_{10}$ | IN914 |
| $R_1$ | 22k |
| $R_2$ | 10k |
| $R_3$ | 22k |
| $R_4$ | 47k |
| $R_5$ | 47k |
| $R_6$ | 100k |
| $R_8$ | 22k |
| $R_9$ | 47K |
| $R_{10}$ | 6800 |
| $R_{11}$ | 100 |
| $R_{12}$ | 12k |

I claim:

1. A regulator circuit for a power supply including a silicon-controlled rectifier for developing a substantially constant transient-free DC voltate from an applied AC voltage source, comprising:
    zero-crossover circuit means responsive to cyclical variations of said AC voltage source for providing a signal indicative of the zero-crossing of one phase of said applied AC voltage source,
    switching means responsive to said zero-crossing signal and coupled to initiate conduction of said silicon-controlled rectifier substantially coincident with said zero-crossing of said applied AC voltage source,
    control logic means responsive to a DC reference potential representative of said developed DC voltage and coupled to provide an output signal to said switching means for suppressing said zero-crossing signal and thereby inhibiting conduction of said silicon-controlled rectifier when said developed DC voltage exceeds a predetermined potential and for triggering conduction of said silicon-controlled rectifier when said developed DC voltage has a value less than said predetermined potential,
    said zero-crossover circuit means further comprising:
    (1) means responsive to a transition from a first polarity of said applied AC voltage source to an opposing polarity for providing a current corresponding to at least a portion of said applied AC voltage source,
    (2) means responsive to said current corresponding to said AC voltage source for providing a pulsed signal of a predetermined polarity,
    (3) means for providing a first reference bias potential,
    (4) logic circuit means responsive to a predetermined algebraic difference of said pulsed signal and said reference bias potential for providing an output signal synchronous with said AC voltage source,
    (5) differentiating circuit means responsive to said synchronous signal for providing a differentiated output signal to further logic circuit means, and
    (6) means for providing a second reference bias potential,
    said further logic circuit means responsive to a predetermined algebraic difference of said differentiated output signal and said second reference bias potential for producing a logic signal output indicative of said zero-crossing of said one phase of said applied AC voltage source.

2. The circuit as set forth in claim 1, wherein said control logic means further comprises:
    means for providing a third reference bias potential, said means for providing an output signal comprising means responsive to an algebraic difference of said third reference bias potential and said DC reference potential for providing a first logic signal when said developed DC voltage exceeds said predetermined potential and a second logic signal when said developed DC voltage does not exceed said predetermined potential, and
    said means for providing an output signal further comprising means for combining said first or second logic signals with said logic signal output of said further logic circuit means.

3. The regulator circuit as set forth in claim 2, wherein said switching means comprises a unidirectional thyristor having a gate electrode coupled to received said combined logic signals for triggering the thyristor, and having an anode coupled to said applied AC voltage source and a cathode coupled to said gate of said silicon-controlled rectifier.

4. The regulator circuit as set forth in claim 3, where said unidirectional thyristor comprises a silicon-controlled rectifier.

5. The regulator circuit as set forth in claim 1, wherein said silicon-controlled rectifier comprises a gate, anode, and cathode electrodes.

6. The regulator circuit as set forth in claim 5, further comprising a diode having a cathode coupled to said anode of said silicon-controlled rectifier and an anode for providing at least a portion of said substantially constant DC voltage.

7. The regulator circuit as set forth in claim 6, further comprising an inductive element having a first terminal coupled to said anode of said diode element and a second terminal for supplying unregulated transient-free voltage to a load, and a capacitive element coupled to said first terminal and to said load.

8. The regulator circuit as set forth in claim 7, wherein said applied AC voltage source comprises a polyphase voltage source, and said zero-crossover circuit comprises a plurality of zero-crossover circuits, ones of said circuits corresponding to ones of each phase of said polyphase voltage source.

9. The regulator circuit as set forth in claim 8, further comprising a plurality of silicon-controlled rectifiers and diode elements, ones of said plurality of rectifiers and ones of said of diode elements coupled to ones of each of said polyphase sources and to ones of said zero-crossover cicuits, respectively, said rectifiers and said diode elements being so constructed and arranged as to define a full-wave rectifier.

10. The regulator circuit as set forth in claim 9, wherein said full-wave rectifier further comprises a bridge rectifier.

11. A zero-crossover control circuit for a polyphase power supply providing a regulated DC output voltage, comprising:

means responsive to a transition from a first polarity of an applied AC voltage source to an opposing polarity for providing a current corresponding to at least a portion of said applied AC voltage source, means responsive to said current corresponding to said AC voltage source for providing a pulsed signal of a predetermined polarity, means for providing a first reference bias potential, logic circuit means responsive to a predetermined algebraic difference of said pulsed signal and said reference bias potential for providing an output signal synchronous with said AC voltage source, differentiating circuit means responsive to said synchronous output signal for providing a differentiated output signal to further logic circuit means, and means for providing a second reference bias potential, said further logic circuit means responsive to a predetermined algebraic difference of said differentiated output signal and said second reference bias potential for producing a logic signal output indicative of said zero-crossing of said one phase of said applied AC voltage source.

* * * * *